(12) United States Patent
Sporn

(10) Patent No.: US 11,109,569 B2
(45) Date of Patent: Sep. 7, 2021

(54) FINGER THROWING TOY

(71) Applicant: Joseph S Sporn, New York, NY (US)

(72) Inventor: Joseph S Sporn, New York, NY (US)

( * ) Notice: Subject to any disclaimer, the term of this patent is extended or adjusted under 35 U.S.C. 154(b) by 0 days.

(21) Appl. No.: 16/031,874

(22) Filed: Jul. 10, 2018

(65) Prior Publication Data

US 2020/0015454 A1    Jan. 16, 2020

(51) Int. Cl.
*A01K 15/02* (2006.01)
*A63H 33/18* (2006.01)
*A63B 43/00* (2006.01)

(52) U.S. Cl.
CPC .......... *A01K 15/025* (2013.01); *A63B 43/002* (2013.01); *A63H 33/18* (2013.01)

(58) Field of Classification Search
CPC . A63B 43/00; A63B 2043/001; A63B 43/002; A63B 43/06; A63H 33/18; A01K 15/025
See application file for complete search history.

(56) References Cited

U.S. PATENT DOCUMENTS

| | | | | |
|---|---|---|---|---|
| 2,153,957 A * | 4/1939 | Davis | ................... | A63H 37/005 446/486 |
| 3,077,051 A * | 2/1963 | Quinones, Jr. | .......... | A63H 33/00 273/DIG. 17 |
| 3,099,450 A * | 7/1963 | Randall | ................... | A63H 33/18 473/588 |
| 3,122,129 A * | 2/1964 | Wise | ................... | A01K 39/0106 119/51.03 |
| 3,416,800 A * | 12/1968 | Randall | ...................... | A63F 7/40 473/588 |
| 3,611,621 A * | 10/1971 | Folson | ................... | A63H 33/08 446/124 |
| 3,930,650 A * | 1/1976 | Watson | ................ | A63B 43/002 473/588 |
| 4,184,682 A * | 1/1980 | Collins | ................... | A63B 65/00 473/596 |
| 4,321,906 A * | 3/1982 | Thornell | ............... | A63F 9/0252 124/10 |
| 4,378,653 A * | 4/1983 | O'Brien | ................. | A63H 33/18 446/46 |
| 4,871,169 A * | 10/1989 | Autorino | ............... | A63B 43/002 473/613 |
| 5,080,359 A * | 1/1992 | Thill | .................... | A63B 43/008 273/DIG. 24 |
| 5,181,724 A * | 1/1993 | Spadoni | ................... | F41J 9/165 273/127 A |
| 5,813,366 A * | 9/1998 | Mauldin, Jr. | ........ | A01K 15/025 119/707 |
| 6,575,855 B1 * | 6/2003 | Buzak | .................... | A63B 43/06 473/569 |
| D527,427 S * | 8/2006 | Andersen | ..................... | D21/398 |
| 7,555,997 B2 * | 7/2009 | Wolfe, Jr. | ............ | A01K 15/025 119/707 |
| 7,618,358 B2 * | 11/2009 | Traub | ................... | A63B 26/003 482/147 |
| 7,727,088 B2 * | 6/2010 | Neal | .................... | A63B 43/002 473/422 |

(Continued)

*Primary Examiner* — Steven B Wong
(74) *Attorney, Agent, or Firm* — Hanes & Bartels LLC

(57) ABSTRACT

A finger tossing toy having a hollow body comprising a pliant unitary wall and at least one square shaped aperture through the wall where the at least one aperture is sized to accept and tightly grip a human finger.

3 Claims, 3 Drawing Sheets

(56) References Cited

U.S. PATENT DOCUMENTS

| | | | | |
|---|---|---|---|---|
| D634,509 S * | 3/2011 | Greer | ............................. | D1/127 |
| D672,927 S * | 12/2012 | Bertsch | ........................ | D30/160 |
| 8,727,919 B1 * | 5/2014 | Gentile | .................. | A63B 43/06 |
| | | | | 473/570 |
| 8,919,290 B2 * | 12/2014 | Ottosson | .............. | A01K 15/025 |
| | | | | 119/707 |
| D809,218 S * | 1/2018 | Yijie | ............................ | D30/160 |
| D819,824 S * | 6/2018 | Moehlenbrock | ............. | D24/211 |
| D840,610 S * | 2/2019 | Toolan | ......................... | D30/160 |
| 2005/0007760 A1 * | 1/2005 | Wu | ............................ | F21K 2/06 |
| | | | | 362/34 |
| 2009/0217885 A1 * | 9/2009 | Peter | .................... | A01K 15/025 |
| | | | | 119/709 |
| 2011/0162911 A1 * | 7/2011 | Wieland | .................. | B66F 11/04 |
| | | | | 182/141 |
| 2012/0192807 A1 * | 8/2012 | Rutherford | .......... | A01K 15/025 |
| | | | | 119/707 |
| 2013/0061816 A1 * | 3/2013 | Aboujaoude | ........ | A01K 15/027 |
| | | | | 119/707 |
| 2016/0242390 A1 * | 8/2016 | Lynch | .................. | A01K 15/025 |
| 2018/0290071 A1 * | 10/2018 | Fish | ..................... | A63H 37/005 |

\* cited by examiner

FINGER THROWING TOY

The present invention relates to toys especially adapted for use by children or adults to play with dogs.

BACKGROUND

Playing fetch with a dog by throwing a ball for the dog to retrieve is fun for the thrower until the ball gets covered with slobber. Thus, it is the object of the present invention to provide a ball-like toy that does not require a full hand grasp of the object in order to project it a distance. The toy may be picked and thrown by the use of only one finger, thus avoiding substantial hand contact with a salivated object.

BRIEF DESCRIPTION OF THE PREFERRED FORM

The finger throwing toy of the present invention includes a hollow hemispherical body having a pole and comprising a pliant unitary wall and a flat pliant equatorial wall plane that defines a base member where the pole of the hemisphere contains a square aperture sized to accept and tightly grip a human finger. Narrow slits extending from the four corners of the aperture along the extended diagonal axes of the aperture define an integrally hinged wall flap between each of two adjoining slits. The underside of each wall flap is provided with a fingertip shaped impression for receiving the tip of a finger inserted into the square aperture to provide increased griping ability. With a finger inserted into the aperture the toy may be picked up and thrown without coming into contact with saliva or other materials that may have accumulated on the surface of the toy. The base member of the hollow toy may also contain a smaller square aperture to accommodate smaller fingers or to finger grip the toy if it lands upside down, that is, with the base member facing up.

DETAILED DESCRIPTION

Figure 1:
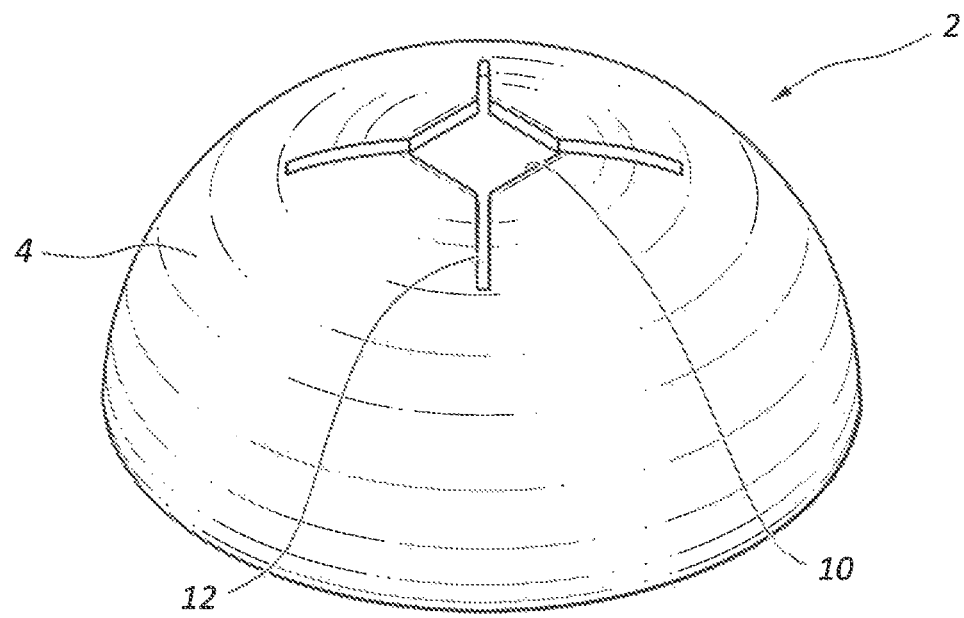
FIG. 1 is a top perspective view of a preferred form of the invention where the toy is hemispherical in shape.
Figure 2:
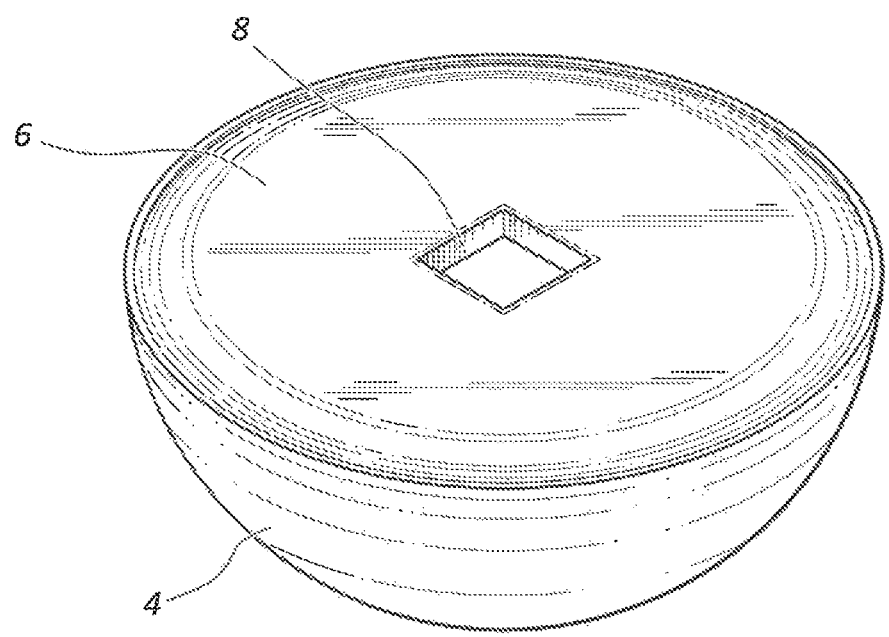
FIG. 2 is a bottom perspective view of the toy of FIG. 1.
Figure 3:
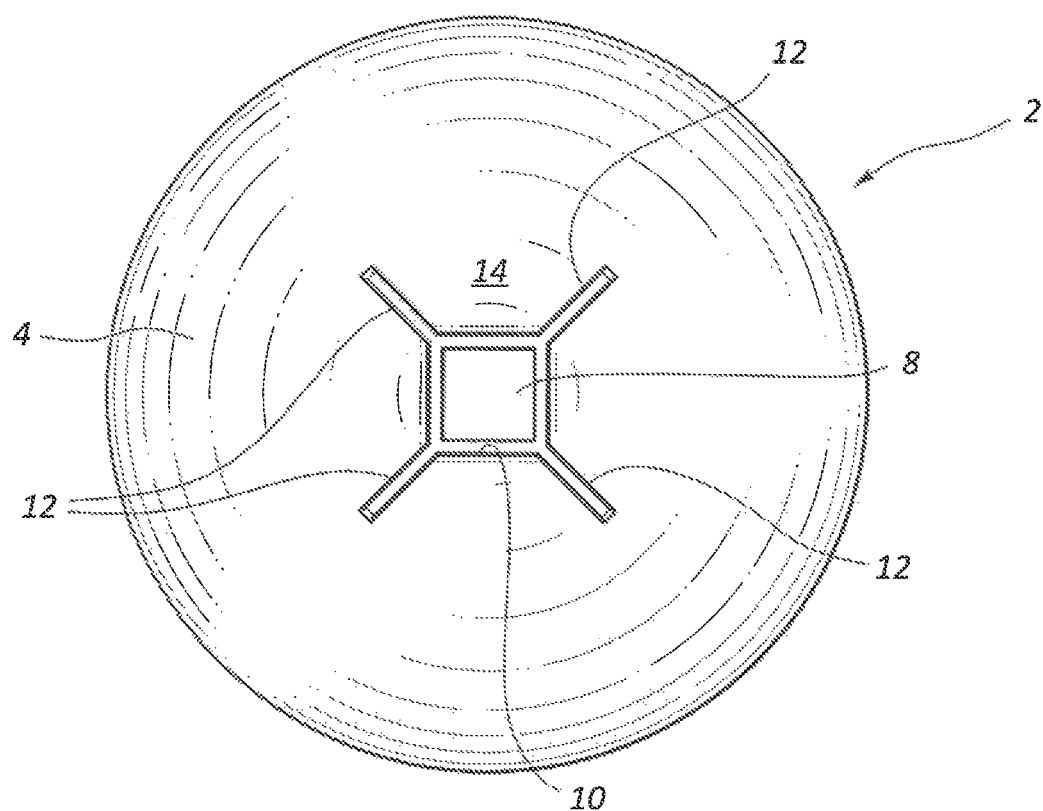
FIG. 3 is a top view of the toy of FIG. 1.
Figure 4:
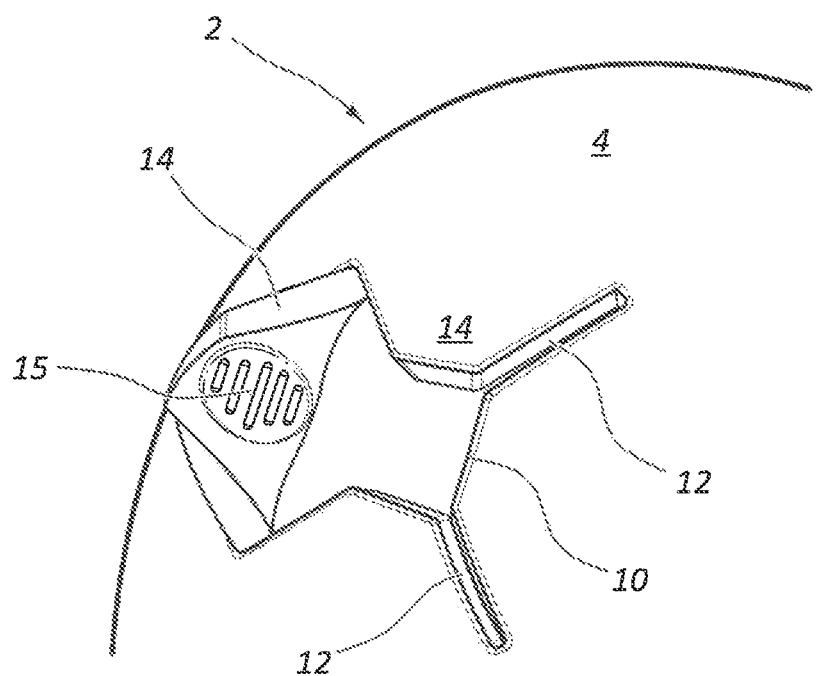
FIG. 4 is a fragmentary top perspective view of the preferred embodiment showing a flap folded back to show the impressed outline of a fingertip.

The preferred form of the finger throwing toy 2 is shown in FIGS. 1, 2 and 4 as being hemispherical in shape like a half ball although other shapes are within the scope of this invention, including spheres. The toy is hollow with a pliant unitary wall 4 and a flat pliant equatorial wall plane that defines a base member 6. A preferred material for the pliant walls and base of the toy is thermo-plastic rubber although other materials such as natural rubber, silicone or other flexible polymers are also usable.

A square aperture 10 through the wall 4 is disposed at the pole, or top of the hemisphere, and is sized to accept and tightly grip a human finger. Narrow slits 12 extend from the four corners of the aperture 10 along the extended diagonal axes of the aperture 10 to define integrally hinged wall flaps 14 between each of two adjoining slits 12. As shown in FIG. 4, the underside of each wall flap is provided with a fingertip shaped impression 15 for receiving the tip of a finger inserted into the square aperture to provide increased griping ability.

As shown in FIG. 2, the flat base member 6 is provided at its center with a square aperture 8 to accept and grip smaller fingers. In addition, if the hemispherical toy comes to rest on its curved surface top, the aperture 8 is available to pick the toy up and turn it over or throw it.

Figure 5:
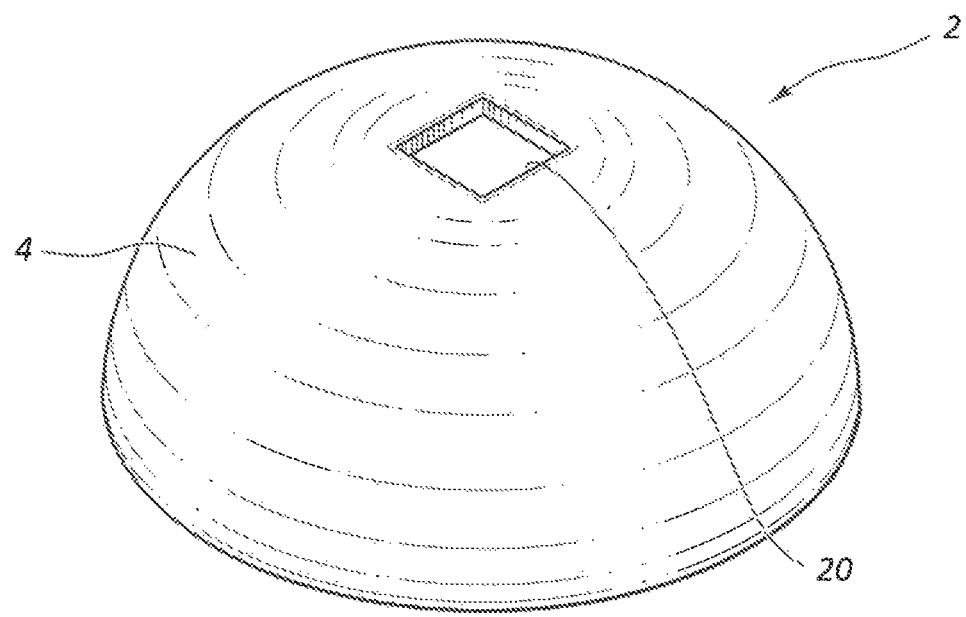
FIG. 5 is a top perspective view of a second embodiment of the present invention.
Figure 6:
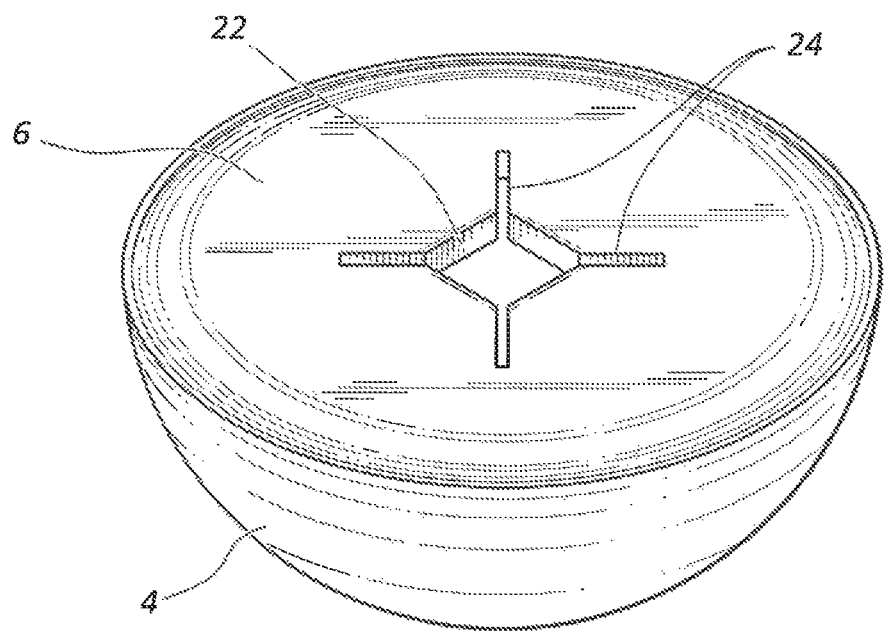
FIG. 6 is bottom perspective view of the second embodiment.

A second embodiment 2a of the invention is illustrated in FIGS. 5 and 6 where the position of each of the two apertures is reversed. At the center of base member 6 a square aperture 22 penetrates the wall of the base member and is sized to accept and tightly grip a human finger. Similar to the preferred embodiment, narrow slits 24 extend from the four corners of the aperture 22 along the extended diagonal axes of the aperture 22 to define integrally hinged wall flaps between each of two adjoining slits 24. Also like the preferred embodiment, each of the flaps is provided on its underside with a fingertip shaped impression for receiving the tip of a finger inserted into the square aperture to provide increased griping ability.

The top or pole of the hemisphere 2a is provided with a square aperture 20 useful for the same reasons as explained for the small aperture 8 in the preferred form.

I claim:

1. A finger tossing toy comprising,
a hollow hemispherical body having a pole and comprising a pliant unitary wall and a flat pliant equatorial wall plane that defines a base member where the pole includes a first square shaped aperture through the wall which first aperture is sized to accept and grip a human finger,
a second square shaped aperture located in the base member and centered on the polar axis of the hemisphere,
a narrow slit extending from at least two of the four corners of the second aperture along the extended diagonal axes of the second aperture defining an integrally hinged wall flap between two adjoining slits, and
a fingertip sized depression in the interior surface of at least one of the hinged flaps.

2. A finger tossing toy comprising,
a hollow pliant hemispherical body having a pole and a flat pliant equatorial wall plane that defines a base member,
a square shaped aperture through the body and centered on the pole where the square shaped aperture is sized to accept and grip a human finger;
an aperture located in the base member and centered on the polar axis of the hemispherical body;
a narrow slit extending from at least two of the four corners of the square shaped aperture along the extended diagonal axes of the square shaped aperture defining an integrally hinged wall flap between two adjoining slits; and
a fingertip sized depression in the interior surface of at least one of the hinged wall flaps.

3. A finger tossing toy comprising,
a hollow pliant hemispherical body having a pole,
an aperture through the body centered on the pole where the aperture is sized to accept and grip a human finger,
a flat pliant equatorial wall plane that encloses the body and defines a base member, a square shaped aperture located in the base member and centered on the polar axis of the hemisphere, a narrow slit extending from at least two of the four corners of the square shaped aperture along the extended diagonal axes of the aperture defining an integrally hinged wall flap between two adjoining slits, and a fingertip sized depression in the interior surface of at least one of the hinged flaps.

\* \* \* \* \*